Nov. 24, 1970    M. ROMOLI    3,541,787
SELF-COMPRESSED CONTINUOUS CIRCULAR INTERNAL COMBUSTION ENGINE
Filed Sept. 6, 1968      7 Sheets-Sheet 1

Inventor
Mario Romoli

BY
Robertson, Bryan, Parmelee & Johnson
ATTORNEYS

Nov. 24, 1970  M. ROMOLI  3,541,787
SELF-COMPRESSED CONTINUOUS CIRCULAR INTERNAL COMBUSTION ENGINE
Filed Sept. 6, 1968  7 Sheets-Sheet 4

Inventor
Mario Romoli

BY
Robertson, Bryan, Parmelee & Johnson
ATTORNEYS.

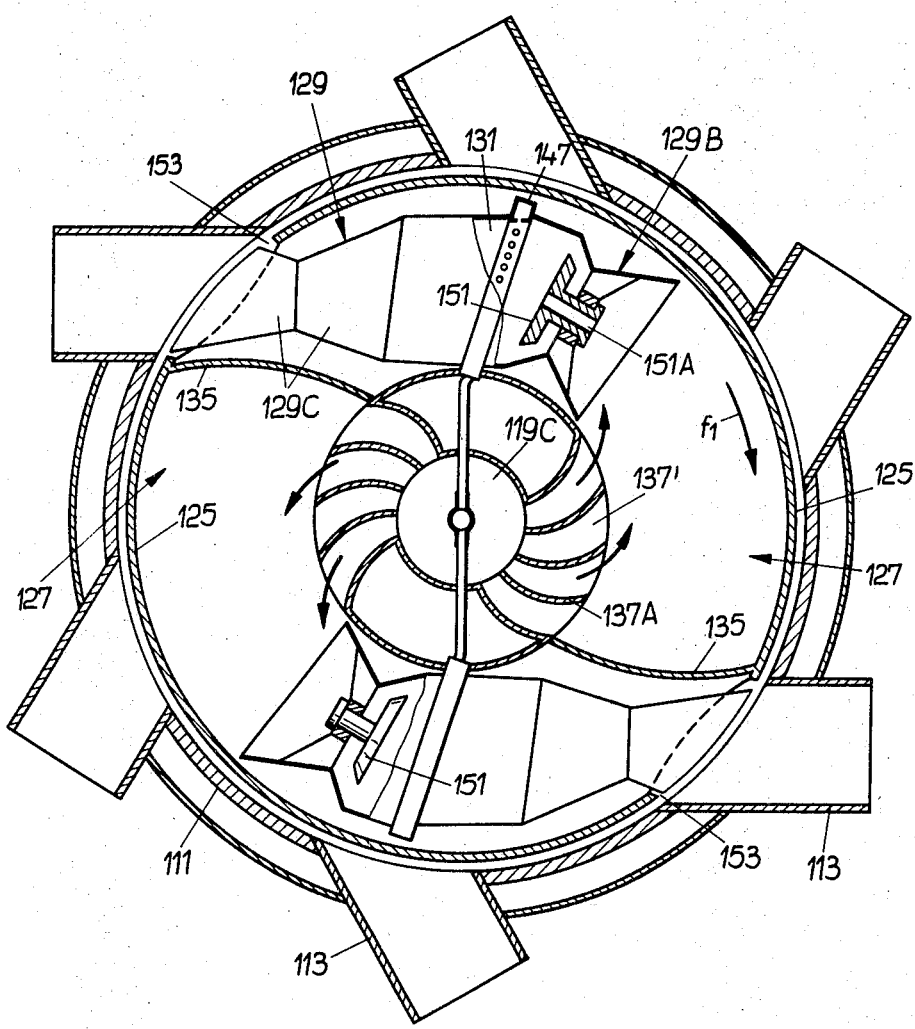

United States Patent Office 3,541,787
Patented Nov. 24, 1970

3,541,787
SELF-COMPRESSED CONTINUOUS CIRCULAR
INTERNAL COMBUSTION ENGINE
Mario Romoli, 133 Via dei Serragli, Florence, Italy
Filed Sept. 6, 1968, Ser. No. 757,911
Claims priority, application Italy, Oct. 30, 1967,
4,788/67; Mar. 15, 1968, 4,486/68
Int. Cl. F02c 3/16
U.S. Cl. 60—39.06
11 Claims

ABSTRACT OF THE DISCLOSURE

A self-compressed continuous circular internal combustion engine, operating as a pure jet or pulse-jet engine in its several embodiments, comprised of a toroidal cavity in which combustion chambers fixed to the driving shaft freely rotate, said combustion chambers compressing air entering the toroidal cavity when rotated through a suitable starting means up to a velocity sufficient for combustion, thereafter fuel being admitted and mixture being ignited.

BACKGROUND OF THE INVENTION

Field of the invention

The present invention relates to a self-compressed continuous circular internal combustion engine, requiring only an auxiliary starting means for bringing it to a starting speed of rotation, thereafter the engine keeping self-compressed and when hot also self-ignited, and operating as a pure jet or pulse-jet engine.

Description of the prior art

All the kinds of internal combustion engines hitherto devised, still have considerable drawbacks, in spite of the numberless studies and improvements made thereto.

Conventional reciprocating piston engines have the known drawbacks of mechanical complexity, poor efficiency, little wear resistance and many possibilities of failure.

Rotary engines up to now carried out showed many inconveniences, not overcome, of seal, high consumption, poor pickup, wear of many parts.

Turbine engines showed to be scarcely suitable for an application on conventional motor vehicles because of their cumbersomeness, consumption, necessity of sound and heat shielding parts, and the impossibility of going under certain minimum dimensions and power.

Jet engines for motor vehicles were hitherto only considered as science fiction in view of their consumption, noise, high power output required for their starting. Both turbine and jet engines are owing their scarce accomodation to motor vehicles, to the necessity of providing air compression devices and many shielding members which are increasing weight, sizes and costs.

SUMMARY OF THE INVENTION

A primary object of the present invention is to provide a self-compressed continuous circular internal combustion engine of great simplicity and high efficiency, so as to be much more economical, practical and powerful of the internal combustion engines hitheto made, either of the conventional piston types or of the rotary type.

Another object of the present invention is to provide a self-compressed continuous circular internal combustion engine, removing necessity of any device for compressing air or mixture, so as to avoid inconveniences of noise arising from compression and discharge of compressed fluids, and those arising from the power required for effecting said compression.

Still another object of the present invention is to provide a self-compressed continuous circular internal combustion engine, wherein absence of internal gearing, controlled valves, pistons, connecting rods and linkages, reduces the components of this engine to a minimum, with great advantages for the manufacture costs, sturdiness, and far less possibilities of failure, with high wear resistance.

Still another object of the present invention is to provide a self-compressed continuous circular internal combustion engine wherein acceleration and compression of air occurs through the shaping of the rotary combustion chambers, removing compression and sealing devices, and allowing a higher efficiency in comparison with prior art internal combustion engines.

Still another object of the present invention is to provide a self-compressed continuous circular internal combustion engine having an inner rotor with combustion chambers designed so as to remove any sealing and lubrication problem, to assure a continuous operation devoid of reciprocating motions thereby removing dead centers and negative strokes, with a consequent higher efficiency.

Still another object of the present invention is to provide a self-compressed continuous circular internal combustion engine having very low weight and dimensions in view of the extremely reduced number of components and the absence of valves, compressors and any other auxiliary device, so that the power required for starting this engine up to the minimum speed of rotation for a continuous self-contained operation, is fed by a simple and little starter.

Still another object of the present invention is to provide a self-compressed continuous circular internal combustion engine of reduced dimension lending itself to several uses, so that it could be also devised the application of the instant engine directly on the axle of each wheel of a motor vehicle, sparing space and increasing power with better weight distribution on the wheels, especially for racers.

Still another object of the present invention is to provide a self-compressed continuous circular internal combustion engine operating with any kind of fuel, even more economical and less refined with gasoline, and more particularly with kerosene.

The foregoing and other objects, features and advantages of the present invention will become more apparent in the light of the following detailed description of preferred embodiments thereof as illustrated in the accompanying drawings.

BRIEF DESCRIPTION OF THE DRAWING

FIG. 9 is a cross-sectional front view of the assembled engine, according to another modified embodiment;

DETAILED DESCRIPTION OF THE PREFERRED EMBODIMENTS

Figure 1:
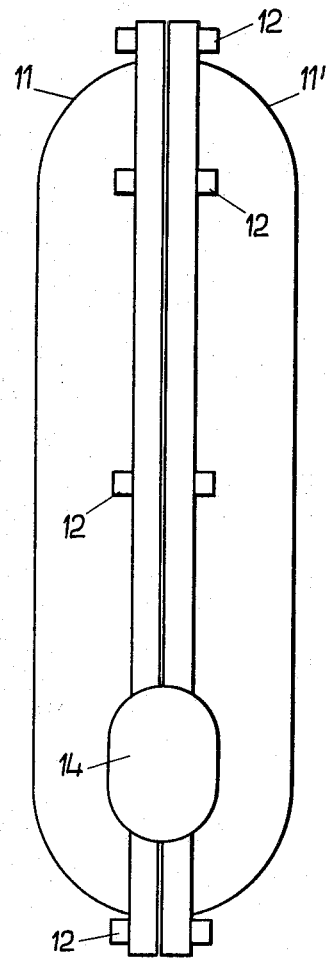
FIG. 1 is a side elevational view of the engine outer housing.
Figure 2:
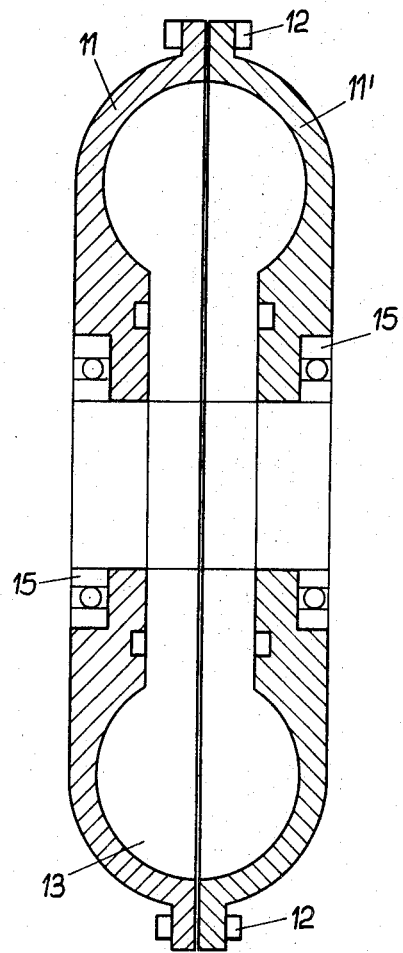
FIG. 2 is a cross-sectional view of said outer housing.
Figure 3:
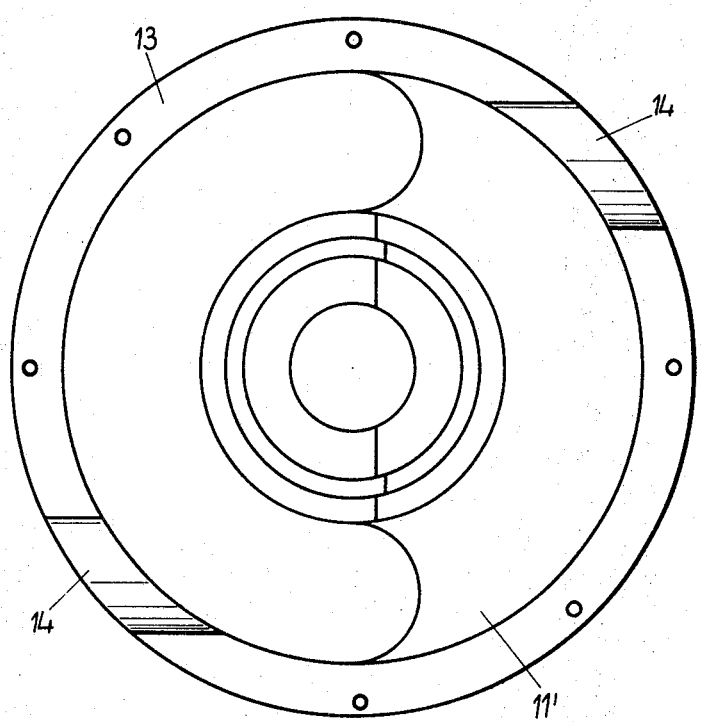
FIG. 3 is an internal front view of one of the two engine housing halves.
Figure 4:
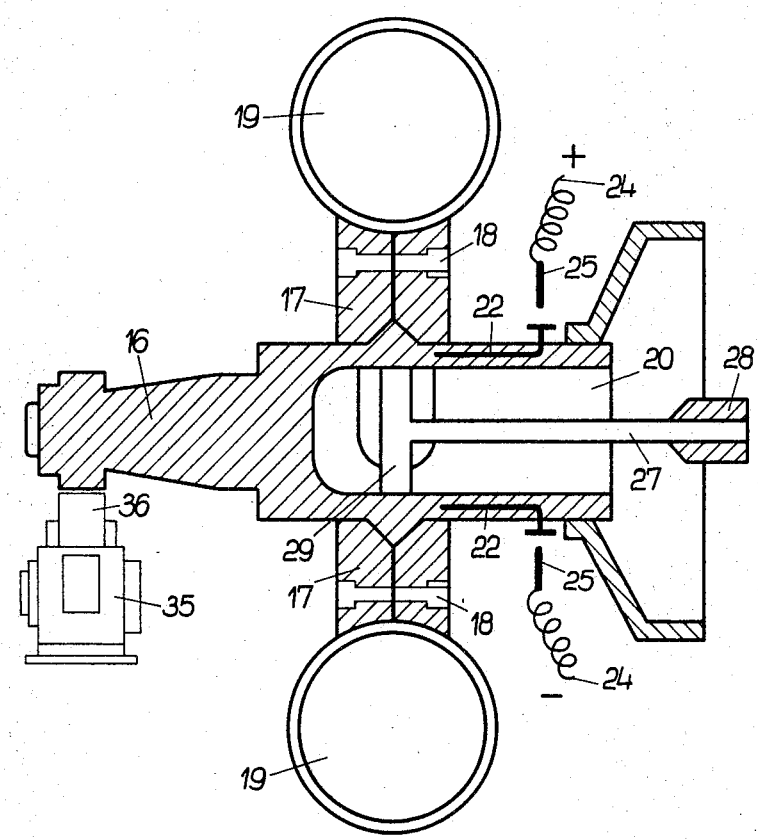
FIG. 4 is a side elevational cross-sectional view of the engine inner rotor.

With reference now to FIGS. 1–6 of the drawings, the self-compressed continuous circular internal combustion engine according to this invention has a stationary outer housing comprised of two parts or halves 11 and 11' joined together by bolts 12, screws or the like.

The housing parts 11 and 11' are shaped so as to define an internal continuous toroidal cavity 13.

At the periphery of the housing there are two opposite and symmetrical openings 14 to which the exhaust pipes (not shown) for the engine burnt gases are applied.

On the outer side of the housing and at its center there are two ball or roller bearings 15 or similar members for supporting the driving shaft 16.

Inside the housing a rotor carries out its revolving motion. The rotor comprises the driving shaft 16 rotating on said bearings 15, two plates 17 joined together by volts 18 and allowing two symmetrical combustion chambers 19 to be fixed in respect of the driving shaft 16.

This inner rotor freely rotates in the inner toroidal cavity 13 of the housing 11, 11'.

The only mechanical friction is given by the rotation of the rotor on the two recesses 21 ending in an inlet port 21' (see FIGS. 5 and 6) through which air to be mixed, after compression, with the fuel is admitted from outside to the toroidal cavity 13.

Two electric leads 22 are arranged in the shaft 16 for feeding electric current to the spark plugs 23 protruding into the combustion chambers 19.

The electric current fed by a suitable source passes from the two leads 24 to an insulated ring 25 placed on the driving shaft 16. This insulated ring has several interruptions so as to obtain a spark of the plug at every passage of the interruptions.

In each combustion chamber 19 there is a hollow annular member 26 of suitable heat resistant material, which fuel enters, coming from a suitable reservoir (not shown) through an intake bushing sealed rotating connector 28 of any available kind, an intake pipe 27 arranged coaxially in the cylindrical recess 20 of the driving shaft 16, and connecting pipes 29.

On the annular surface of the hollow member 26, facing the interior of the combustion chamber 19, there is a row of little gaged holes 32 directed toward the ideal center of the annular member 26. When the admission of fuel will be opened through suitable means (not shown) arranged between engine and reservoir, fuel will enter the combustion chamber 19 through said holes or nozzles 32.

Figure 5:
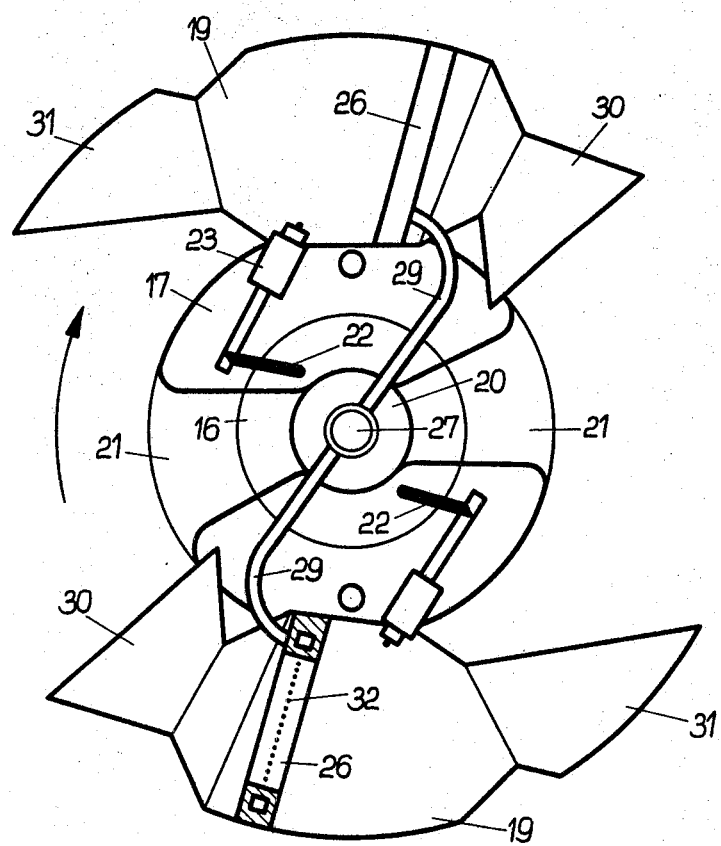
FIG. 5 is a cross-sectional front view of the engine inner rotor.
Figure 6:
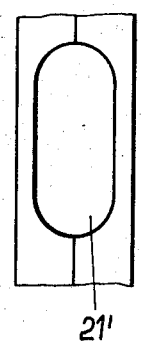
FIG. 6 is a detailed view of the air inlet port.

A starter 35 connected through suitable gearing 36 to the driving shaft 16 will cause the rotor to rotate in the direction of the curved arrow indicated in FIG. 5. When the rotor reaches a predetermined number of revolutions per minute, e.g. 7,000–8,000 r.p.m., air entering the coaxial cylindrical cavity 20 of the driving shaft 16 and therefrom through the inlet 21', 21 entering the toroidal cavity 13, will form an air flow which is compressed by the gradually faster and faster rotation of the combustion chambers 19, is forced to pass through the inlet part 30 of the combustion chambers 19. This inlet part 30 of the combustion chambers 19 is shaped as a Venturi tube, with a predetermined gradually decreasing cross-sectional area, which increases the velocity of the air in an inversely proportional manner.

Thus, the air flow will enter the real combustion chamber 19, and as it expands in view of the increased cross-sectional area of this section 19, said air flow velocity is decreased with a corresponding high increase of pressure, while at the same time the air flow atomizes fuel, which is admitted at the proper time through the holes or nozzles 32 of the hollow annular member 26, either because of gravity or of centrifugal force due to the rotation of the combustion chambers 19.

The mixture so obtained has a pressure which is sufficient for the explosion and is ignited by spark plugs 23. The mass of burnt gases will tend to discharge through the rear outlet 31, directed toward the peripheral wall of the toroidal cavity 13, i.e. toward the exhaust ports or openings 14. This flow of exhaust gases will generate a thrust which is directed by reaction in the same direction as the starting motion.

Subsequently, when the combustion chambers 19 and more particularly their rear outlets 31 are sufficiently hot, this engine will begin to be self-ignited so that the operation of the spark plugs 23 may be stopped. In this way a continuous operation, adjusted by the amount of fuel admission, is created. If the fuel admittance is closed, the engine is stopped. If a considerable braking action of the engine is required, after having interrupted the fuel flow at the combustion chambers, it is possible to close wholly or partially the exhaust ports.

Tests have been made on a full scale model, obtaining an excellent operation employing kerosene as a fuel, without noise and no inconveniences were found, while the temperature of the exhaust gases was measured to be about 800° C., that is not far away from the temperature of the exhaust gases of the conventional internal combustion engines.

Figure 7:
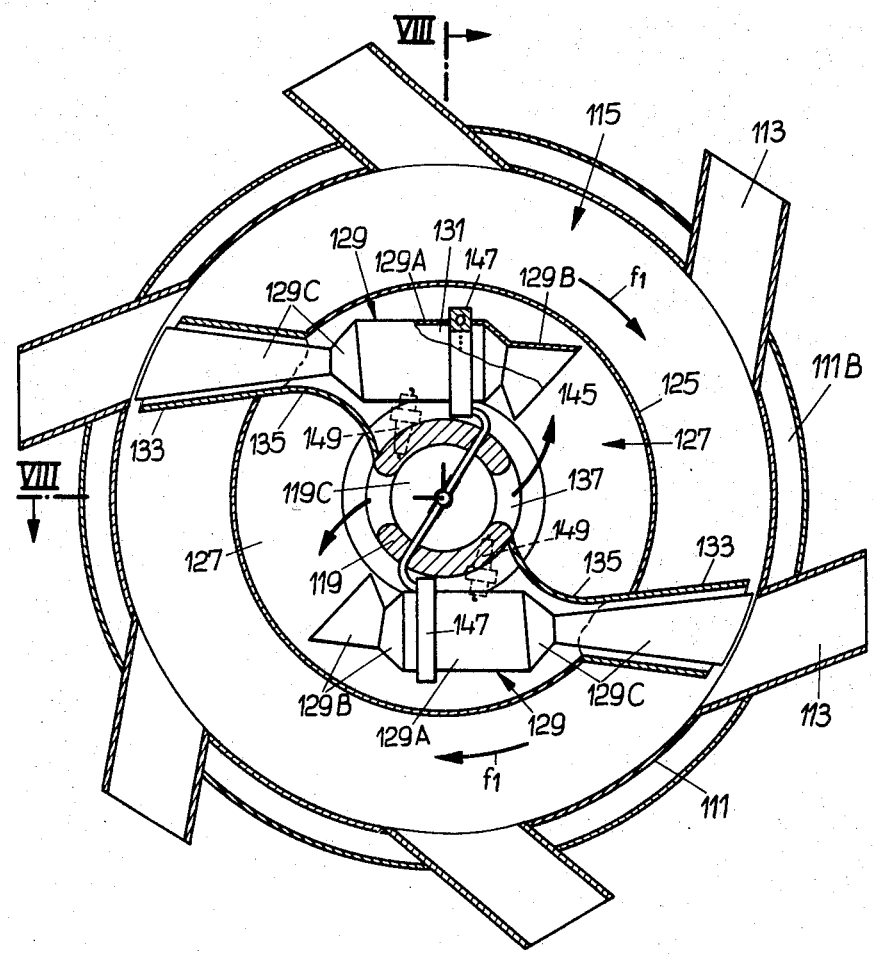
FIG. 7 is a cross-sectional front view of the assembled engine, in a modified embodiment.
Figures 8, 10, 11:
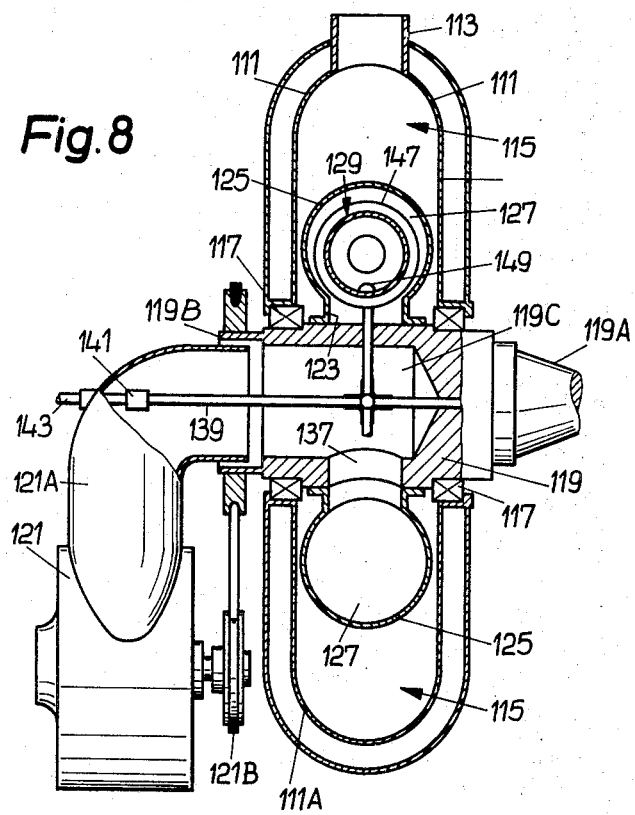
FIG. 8 is a cross-sectional view taken along line 8—8 of FIG. 7.
FIG. 10 is a detailed cross-sectional view of a modified combustion chamber.
FIG. 11 is a cross-sectional view taken along line 11—11 of FIG. 10.

With reference now to FIGS. 7–8, an annular stationary housing 111 is shown, having a plurality of exhaust ducts 113 which are distributed along the circumference and have a nearly tangential orientation. The housing 111 defines with its plane disc-like parts 111A a circular cavity 115, in which the rotor is arranged. Heat may be taken from cavity 115 through walls 111, 111A, e.g. by providing a hollow space 111B enclosing said walls 111, 111A, or an outer insulating layer, fins or any other suitable device.

Through bearings 17 on the structure of the cavity 115 there is supported the driving shaft 119 of the rotor. At the end 119A the driving shaft 119 may be provided with a power take-off. At the opposite end the driving shaft 119 forms an air intake, through an inlet 119B joined to a hollow section 119C coaxial to driving shaft 119. To the inlet 119B there is sealingly connected the admission duct 121A of a compressor or fan 121, the impeller of which (not shown) is actuated for instance through a belt drive 121B by the said driving shaft 119.

A toroidal wall 125 is fixed to the driving shaft 119 through transverse and annular connecting section 123, said toroidal wall 125 defining a feeding chamber 127. Two combustion groups 129 are fixed in the feeding chamber 127. It is to be understood that the combustion groups 129 might be also more than two, arranged symmetrically around the driving shaft 119.

Said combustion groups 129 have a central body 129A forming a combustion chamber 131, which upstream (in the direction of rotation of the rotor indicated by the arrow $f_1$) has a feeding inlet 129B in the form of a Venturi tube, while downstream it has a discharge outlet 129C which has also a particular double cone shape and extends beyond the periphery of the toroidal wall 125 reaching the periphery of the stationary outer wall 111.

The discharge outlet 129C has the portion protruding from wall 125 enclosed within an external wall 133, defining with said outlet 129C a hollow space through which air may flow away from feeding chamber 127, said air sliding at the outside on the inlet 129B and combustion chamber 129A. Downstream each group 129 there is a partition wall 135 transversely closing the feeding chamber 127, so that said feeding chamber 127 is divided by the partitions 135 into as many zones as the groups are (two in this embodiment). Each of these zones is in communication with the hollow section 119C of the driving shaft 119 through passageways 137 extending about radially in the shaft 119 and in the gap between the connecting sections 123. An axial rotating pipe 139 extends coaxially to the driving shaft 119 inside the inlet 119B and the hollow section 119C, and is connected through a suitable sealing and connecting means 141 to a stationary pipe 143 feeding fuel from a reservoir (not shown). Fuel is fed under pressure or is sucked by the centrifugal force acting on ducts 145 extending in the rotor from pipe 139 up to corresponding annular manifolds 147 of the combustion groups 129; said manifolds 147 are feeding fuel to the combustion chambers 131 through a plurality of radial centripetal nozzles or holes of said manifolds 147; ignition devices 149 of known type, such as spark plugs and the like are protruding into the combustion chambers 131.

According to the embodiment of FIG. 9, where same reference numerals are indicating similar parts, the passageways between the hollow section 119C of the driving shaft 119 and the feeding chamber 127 defined by the toroidal wall 125, are formed by passages 137' suitably shaped and provided with baffles 137A, enhancing air drawing in view of the rotary motion of the rotor in the direction of the arrow $f_1$, so as to develop an air suction and centrifugal compressor device.

Again with reference to FIG. 9, the combustion groups 129 are provided, at the neck portion of the Venturi tube 129B, with a throttle valve 151 which is moving along a tangent of the axis of the combustion chamber, so that in this embodiment the combustion chambers are operating as a pulse-jet engine, while in the preceding embodiments they are operating as a pure jet engine, as the throttle valves 151 are controlled by back pressure governing the combustion chambers 131, against the action of return or counter springs, not shown.

Valve 151 shown in the upper portion of FIG. 9 is crossed by an axial passageway 151A assuring a limited passage of air toward the combustion chamber 131; said passageway 151A is omitted in the arrangement of the lower portion of FIG. 9. The throttle or control valves 151 could also be controlled by suitable linkages.

According to FIG. 9, the discharge outlets 129C are discharging the gases through openings 153 made in the walls 125 without air spaces defined by walls 133, like in FIGS. 7–8, but always with a flow of air around the outlets.

According to the embodiment of FIGS. 1–11, the combustion group 129 has a plurality of longitudinal fins 155 for both stiffening and cooling purposes. Said fins 155 may have an inner shape following that of the walls of the combustion group 129 and an outer shape following that of the toroidal wall 125.

Operation of these embodiments of the engine is substantially the same as that of FIGS. 1–6. Rotation of rotor is initiated through a starter or the like, and by this rotation an air feed through the axial hollow passage 119C is caused, air being admitted under pressure by a separate compressor, and/or by an axial compressor such as 121, and/or by centrifugal force in the passageways 137 or 137', with the aid of the eventual baffles 137A. Because of the rotation in the direction of arrow $f_1$, air reaching feeding chamber 127 enters the inlet 129B of each combustion group 129 and reaches combustion chamber 131, wherein air is mixed with fuel and mixture ignited at least at the beginning by ignition means 149 and thereafter by the flame kept in the combustion chamber. Hot exhaust gases come out from discharge outlet 129C and go out to the atmosphere in an intermittent manner through the stationary openings 113 distributed along the circular path of the free ends of the rotating discharge outlets 129C. Fuel may be fed under pressure from duct 143 or sucked by centrifugal force along ducts 145 for being delivered by the inner nozzles of the manifolds 147.

Air fed to the feeding chambers 127 partially passes between the toroidal wall 125 and each combustion group 129, sliding on the external surfaces of said groups and going out through the air spaces defined between walls 133 and outlets 129C or through openings 153; in this way each group 129 is isolated and its walls are cooled, which may be also improved by fins 155 (FIGS. 10 and 11), when provided.

After starting, rotation is assured by reaction of the burnt gases coming out from discharge outlets 129C.

Air feeding to the combustion chambers may occur in an adjusted manner through valves, such as the valve 151, eventually provided with the passageway 151A and remote controlled or governed by the eventual back pressure of gases in the combustion chamber 131, in such a case valves 151 being biased by suitable loaded or compressed springs. Instead of valves a stem 161 (see FIG. 10) may be provided, having an expanded head 161A, in order to produce in the fluid stream a suitable turbulence adapted to assure the flame permanency and to avoid the eventual possibility of its extinguishing.

Although the invention has been shown and described with respect to preferred embodiments thereof, it should be understood by those skilled in the art that the foregoing and other changes and omissions in the form and detail thereof may be made therein without departing from the spirit and scope of the invention.

I claim:

1. A rotary internal combustion engine of the toroidal type having combustion chambers with jet exhausts arranged to produce rotary movement within a continuous toroidal cavity wherein the improvement comprises:

a toroidal cavity the diameter of which is a substantial portion of the radius of the toroid, means for radially feeding a substantial quantity of air at essentially atmospheric pressure into said toroidal cavity and directly into the path of said rotating combustion chambers.

said rotating combustion chambers substantially filling the cross-sectional area of said toroidal cavity and having Venturi shaped inlets to impart increased velocity to and subsequent expansion of the inflowing air, decreasing the velocity, with a corresponding rapid and substantial increase in pressure, means for burning fuel in the compressed air in said chamber, and means for rotating said rotating combustion chambers to a sufficient rotary speed to provide a continuously operating rotary internal combustion engine whereby the rotary motion of said chambers and Venturi inlets, and the walls of said toroidal cavity provide the necessary substantial compression of said inflowing air.

2. A rotary internal combustion engine of the toroidal type claimed in claim 1 wherein fuel ports are arranged at the outlets of said Venturi inlets of said combustion chambers for introducing fuel into said chambers wherein the fuel is atomized by the through-flowing compressed air within the chamber forming a combustible mixture.

3. A rotary internal combustion engine of the toroidal type claimed in claim 1 and means for interrupting the operation of said fuel burning means when said combustion chambers are sufficiently hot to reduce ignition wear whereby continuous self-ignition is maintained.

4. A rotary internal combustion engine of the toroidal type claimed in claim 1 wherein longitudinally extending and transversely spaced fins are arranged along the external surface of said combustion chambers for cooling said chambers, said fins have an inner portion following the external surface of said combustion chambers and an outer portion following said toroidal cavity.

5. A rotary internal combustion engine of the toroidal type claimed in claim 1 wherein said radial feeding means includes a hollow drive shaft and rotor concentrically arranged to rotate therewith whereby a substantial quantity of air is directed axially through said shaft and radially through said rotor directly into said toroidal cavity.

6. A rotary internal combustion engine of the toroidal type as claimed in claim 5 wherein said rotor includes a plurality of baffles providing a plurality of passages for direct radial transmission of the inflowing air from said hollow shaft to said toroidal cavity.

7. A rotary internal combustion engine of the toroidal type as claimed in claim 1 wherein said individual combustion chambers are of a slightly less diameter than that of said toroidal cavity, and are formed to direct a portion of the inflowing air around each of said chambers to provide cooling thereof.

8. A rotary internal combustion engine of the toroidal type as claimed in claim 1 including discharge ports arranged in said toroid, each of said combustion chambers having an outlet arranged in a double cone shape for discharge of the exhaust through said discharge ports at increased pressure.

9. A rotary internal combustion engine of the toroidal type as claimed in claim 1 wherein means for controlling the flow of air into each of said chambers is positioned within each of said chambers to operate the engine as a pulse-jet.

10. A rotary internal combustion engine of the toroidal type as claimed in claim 1 wherein means for producing turbulence is positioned within each of said chambers to provide flame permanency.

11. A method of providing a continuous self-compressing and self-igniting rotary internal combustion power comprising the steps of:
  rotating combustion chambers within a toroidal shaped zone;
  feeding a supply of air radially at atmospheric pressure outwardly into the toroidal cavity;
  compressing the air in the toroidal cavity in part by centrifugal force;
  substantially increasing the compression of the partially compressed air by forcing it through a Venturi shaped zone prior to a combustion zone in said chambers;
  interjecting fuel into said combustion zone to provide a combustible fuel-air mixture with the compressed air;
  igniting said combustible mixture to cause burning;
  ejecting said burning mixture through a jet velocity reaction zone;
  interrupting the ignition when the combustion chambers are sufficiently hot to provide a continuous self-igniting and self-compressing rotary internal combustion engine; and
  controlling the rotary speed by the flow rate control of fuel.

References Cited

UNITED STATES PATENTS

| | | | |
|---|---|---|---|
| 2,444,742 | 7/1948 | Lutjen | 60—39.35 XR |
| 2,465,856 | 3/1949 | Emigh | 60—39.35 XR |
| 2,499,863 | 3/1950 | Hart | 60—39.35 |
| 2,709,889 | 6/1955 | Mount | 60—39.35 XR |
| 2,710,067 | 6/1955 | Pesaro | 60—39.35 XR |
| 2,890,570 | 6/1959 | Castles | 60—39.35 |
| 3,007,309 | 11/1961 | Meyer | 60—39.35 |
| 3,085,399 | 4/1963 | Kitchens | 60—39.35 |
| 3,130,545 | 4/1964 | Schlumbohm | 60—39.35 |
| 3,321,911 | 5/1967 | Myles | 60—39.35 |

FOREIGN PATENTS 623,855   8/1961   Italy

CARLTON R. CROYLE, Primary Examiner

U.S. Cl. X.R.
60—39.34, 39.35

UNITED STATES PATENT OFFICE
CERTIFICATE OF CORRECTION

Patent No. 3,541,787  Dated November 24, 1970

Inventor(s) Mario Romoli

It is certified that error appears in the above-identified patent and that said Letters Patent are hereby corrected as shown below:

Column 1, line 65, "types" should read -- type --. Column 2, line 34, "dimension" should read -- dimensions --. Column 3 line 20, "volts" should read -- bolts --. Column 4, line 35, "17" should read -- 117 --. Column 5, line 42, "FIGS. 1-11" should read -- FIGS. 10-11 --.

Signed and sealed this 27th day of April 1971.

(SEAL)
Attest:

EDWARD M.FLETCHER,JR.
Attesting Officer

WILLIAM E. SCHUYLER,
Commissioner of Patent